(12) United States Patent
Yun et al.

(10) Patent No.: US 7,681,216 B2
(45) Date of Patent: *Mar. 16, 2010

(54) METHOD OF TRANSMITTING BROADCAST SIGNAL, METHOD OF PROCESSING BROADCAST SIGNAL AND APPARATUS FOR THE SAME

(75) Inventors: Chang Sik Yun, Seoul (KR); Jin Pil Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 169 days.

This patent is subject to a terminal disclaimer.

(21) Appl. No.: 11/984,540

(22) Filed: Nov. 19, 2007

(65) Prior Publication Data

US 2008/0120645 A1  May 22, 2008

Related U.S. Application Data

(63) Continuation of application No. 11/978,712, filed on Oct. 30, 2007.

(30) Foreign Application Priority Data

Nov. 22, 2006  (KR) .................. 10-2006-0115624

(51) Int. Cl.
  *H04N 7/10* (2006.01)
  *H04N 7/025* (2006.01)
(52) U.S. Cl. .................. 725/33; 725/67; 725/68; 725/70; 725/71; 340/286.02; 455/404.1
(58) Field of Classification Search ............ 725/33, 725/67–68, 70–71; 340/286.02; 455/404.1
See application file for complete search history.

(56) References Cited

U.S. PATENT DOCUMENTS

| 4,656,629 | A | * | 4/1987 | Kondoh et al. ............... 370/522 |
| 5,659,366 | A | * | 8/1997 | Kerman ....................... 725/34 |
| 6,020,913 | A | * | 2/2000 | Bush et al. .................... 725/33 |
| 6,204,761 | B1 | * | 3/2001 | Vanderable ............ 340/539.28 |

(Continued)

FOREIGN PATENT DOCUMENTS

CN  1722804  1/2006

(Continued)

OTHER PUBLICATIONS

Society of Cable Telecommuniations Engineers (SCTE), Emergency Alert Message for Cable, Dec. 2002, ANSI, J-STD-042, All Pages.*

*Primary Examiner*—Jason P Salce
(74) *Attorney, Agent, or Firm*—McKenna Long & Aldridge LLP

(57) ABSTRACT

A method of processing a broadcast signal relevant to an emergency alert and a broadcast receiver for the same are disclosed, by which information on a channel for carrying an emergency alert broadcast can be prevented from being overlapped with information on other general channels. The present disclosure generating an emergency alert table including frequency information of an emergency alert channel, and transmitting a digital broadcasting signal including the emergency alert table, wherein the frequency information of the emergency alert channel is inserted in a descriptor that provides an additional pointer to the emergency alert channel, wherein the descriptor references the emergency alert channel by means of the frequency information.

12 Claims, 6 Drawing Sheets

U.S. PATENT DOCUMENTS

| | | | | |
|---|---|---|---|---|
| 6,543,051 | B1* | 4/2003 | Manson et al. | 725/33 |
| 7,038,581 | B2* | 5/2006 | Kendall et al. | 340/506 |
| 7,054,612 | B2* | 5/2006 | Patel | 455/404.1 |
| 7,159,230 | B2* | 1/2007 | Manson et al. | 725/33 |
| 7,444,657 | B2* | 10/2008 | Kendall et al. | 725/33 |
| 7,454,773 | B2* | 11/2008 | Pugel et al. | 725/33 |
| 7,506,349 | B2* | 3/2009 | Rodolico | 725/33 |
| 2002/0157101 | A1* | 10/2002 | Schrader et al. | 725/64 |
| 2003/0093788 | A1* | 5/2003 | Takenaka | 725/33 |
| 2003/0121036 | A1* | 6/2003 | Lock et al. | 725/33 |
| 2005/0086685 | A1* | 4/2005 | Rahman et al. | 725/33 |
| 2005/0118984 | A1* | 6/2005 | Akiyama et al. | 455/404.2 |
| 2005/0212504 | A1* | 9/2005 | Revital et al. | 324/100 |
| 2006/0015916 | A1 | 1/2006 | Yun | |
| 2006/0020959 | A1* | 1/2006 | Masuda | 725/25 |
| 2006/0048180 | A1* | 3/2006 | Kendall et al. | 725/33 |
| 2006/0059512 | A1* | 3/2006 | Pugel | 725/33 |
| 2006/0159128 | A1* | 7/2006 | Chen et al. | 370/486 |
| 2007/0118861 | A1* | 5/2007 | Stone | 725/80 |
| 2007/0136743 | A1* | 6/2007 | Hasek et al. | 725/33 |
| 2007/0157209 | A1* | 7/2007 | Hashimoto et al. | 718/104 |
| 2008/0046524 | A1* | 2/2008 | Jerding et al. | 709/206 |

FOREIGN PATENT DOCUMENTS

| | | |
|---|---|---|
| EP | 1 617 666 A2 | 1/2006 |
| WO | WO 2006/121801 A1 | 11/2006 |

* cited by examiner

FIG. 1

| Syntax | Bits | Description |
|---|---|---|
| table_ID | 8 | value 0xD8 |
| section_syntax_indicator | 1 | '1' |
| zero | 1 | '0' |
| reserved | 2 | '11' |
| section_length | 12 | uimsbf |
| table_id_extension | 16 | '0x0000' |
| reserved | 2 | '11' |
| sequence_number | 5 | uimsbf |
| current_next_indicator | 1 | bslibf |
| section_number | 8 | uimsbf |
| protocol_version | 8 | uimsbf |
| last_section_number | 8 | uimsbf |
| EAS_originator_code | 24 | Three ASCII characters |
| EAS_event_code_length | 8 | uimsbf(N) |
| EAS_event_code | 8+N | N ASCII characters |
| nature_of_activation_text_length | 8 | uimsbf |
| nature_of_activation_text() | 8 | uimsbf |
| alert_message_time_remaining | var | uimsbf range 0~120 |
| event_start_time | 32 | uimsbf |
| event_duration | 16 | uimsbf range 15~60000 |
| reserved | 12 | bslibf |
| alert_priority | 4 | uimsbf |
| reserved | 4 | '1111' |

| Syntax | Bits | Description |
|---|---|---|
| alert_text_length | 16 | uimsbf |
| alert_text() | var | var |
| location_code_count | 8 | uimsbf |
| for(I=0;I<location_code_count;I++) { | | |
| state_code | 8 | uimsbf 0~99 |
| state_subdivision_code | 8 | uimsbf 0~99 |
| county_code | 8 | uimsbf 0~99 |
| } | | |
| exception_count | 8 | uimsbf |
| for(I=;I<exception_count;I++) { | | |
| exception_major_channel_number | 16 | uimsbf |
| exception_minor_channel_number | 16 | uimsbf |
| } | | |
| reserved | 6 | '111111' |
| description_length | 10 | iimsbf |
| for(I=0;I<N;I++) { | | |
| descriptor() | var | Optional |
| } | | |
| CRC_2 | 32 | |

| Field Name | Eits | Description |
|---|---|---|
| EAT_channel_descriptor() { | | |
| descriptor_tag | 8 | value 0xEA |
| descriptor_length | 8 | uimsbf |
| details_majer_channel_number | 16 | uimsbf |
| details_mncr_channel_numbe | 16 | uimsbf |
| carrier_frequency | 32 | uimsbf |
| details_channel_programNumber | 8 | uimsbf |
| details_channel_tsID | 16 | uimsbf |
| } | | |

Terrestrial broadcasting station    Relay service provider    Viewer

FIG. 4

| Syntax | Bits | Description |
|---|---|---|
| table_ID | 8 | value 0xD8 |
| section_syntax_indicator | 1 | '1' |
| zero | 1 | '0' |
| reserved | 2 | '11' |
| section_length | 12 | uimsbf |
| table_id_extension | 16 | '0x0000' |
| reserved | 2 | '11' |
| sequence_number | 5 | uimsbf |
| current_next_indicator | 1 | bslibf |
| section_number | 8 | uimsbf |
| last_section_number | 8 | uimsbf |
| protocol_version | 8 | uimsbf |
| EAS_originator_code | 24 | Three ASCII characters |
| EAS_event_code_length | 8 | uimsb(N) |
| EAS_event_code | 8+N | N ASCII characters |
| nature_of_activation_text_length | 8 | uimsbf |
| nature_of_activation_text() | 8 | uimsbf |
| alert_message_time_remaining | var | uimsbf range 0~120 |
| event_start_time | 32 | uimsbf range 15~60000 |
| event_duration | 16 | uimsbf |
| reserved | 12 | bslibf |
| alert_priority | 4 | uimsbf |
| reserved | 4 | '1111' |

| Syntax | Bits | Description |
|---|---|---|
| alert_text_length | 16 | uimsbf |
| alert_text() | var | var |
| location_code_count | 8 | uimsbf |
| for(I=0;I<location_code_count;I++) { | | |
| state_code | 8 | uimsbf 0~99 |
| state_subdivision_code | 8 | uimsbf 0~99 |
| county_code | 8 | uimsbf 0~99 |
| channel_index | 16 | uimsbf |
| } | | |
| exception_count | 8 | uimsbf |
| for(I=1;I<exception_count;I++) { | | |
| exception_major_channel_number | 16 | uimsbf |
| exception_minor_channel_number | 16 | uimsbf |
| } | | |
| reserved | 6 | '111111' |
| description_length | 10 | iimsbf |
| for(I=0;I<N;I++) { | | |
| descriptor() | var | Optional |
| } | | |
| CRC_2 | 32 | |

FIG. 5

| Field Name | Bits | Description |
|---|---|---|
| EAT_channel_descriptor() {<br>    descriptor_tag<br>    descriptor_length<br>    location_code_count<br>    for (I=0;I<location_code_count;I++)<br>    { | <br>8<br>8<br>8 | <br>value 0xEA<br>uimsbf<br>uimsbf |
|         channel_index | 16 | uimsbf |
|         details_major_channel_number<br>        details_minor_channel_number<br>        carrier_frequency<br>        details_channel_programNumber<br>        details_channel_tsID<br>    }<br>} | 16<br>32<br>8<br>16 | uimsbf<br>uimsbf<br>uimsbf<br>uimsbf |

METHOD OF TRANSMITTING BROADCAST SIGNAL, METHOD OF PROCESSING BROADCAST SIGNAL AND APPARATUS FOR THE SAME

This application is a continuation of prior U.S. patent application Ser. No. 11/978,712 filed Oct. 30, 2007, which claims priority to Korean Patent Application No. 10-2006-0115624, filed Nov. 22, 2006, each of which is incorporated herein by reference in its entirety

BACKGROUND OF THE INVENTION

1. Field of the Disclosure

The present disclosure relates to a method of transmitting broadcast signal, apparatus for processing broadcast signal and method thereof.

2. Discussion of the Related Art

Recently, natural disasters including unexpected earthquakes and floods or emergency situations including terrors, arsons and the like tend to take place more frequently. Natural disasters due to environmental pollution or terrors cause more damages widely and their secondary effects become more powerful. In case that one of the aforesaid emergency takes place, the coverage of the emergency is filed. News relating to the emergency is then broadcasted in a format such as a newsflash and the like on all channels after a prescribed duration.

Basic protocol for processing an emergency alert system message has been determined for televisions and the like for sale in North America. And, a basic protocol for receiving and processing an emergency alert system message correctly is determined for cable digital TVs as well. However, in case that the emergency alert system message defined in the specifications of cable digital TV, e.g., an emergency alert table (hereinafter abbreviated EAT) is intactly applied to a terrestrial broadcasting system, the following problems rise.

First of all, in case of applying an EAT defined for a related art cable digital broadcasting environment to a terrestrial broadcasting system, information on a channel for carrying emergency alert broadcast may be duplicated instead of being unified. For instance, in case of a cable broadcasting system in which a single broadcasting station is capable of managing all channels, channel numbers of all channels broadcasted inband can be managed using a major channel number (physical channel number) and a minor channel number (program number) only. Yet, in case of terrestrial broadcasting, there exist a plurality of terrestrial broadcasting stations separately. So, a channel number of a channel broadcasted by each of the broadcasting stations can be arbitrarily set. So, the identical major and minor channel numbers may be used by different broadcasting stations.

Secondly, in case of applying the EAT defined in the related art cable digital broadcasting environment to a terrestrial broadcasting system, a relay service provider is able to change a frequency of a channel for carrying emergency alert broadcast arbitrarily in retransmitting the EAT. So, although an emergency takes place, a receiver may be substantially tuned to a channel differing from the initially intended channel for carrying the emergency alert broadcast.

SUMMARY OF THE INVENTION

Accordingly, the present disclosure is directed to a method of transmitting broadcast signal, an apparatus for processing broadcast signal and method thereof that substantially obviate one or more problems due to limitations and disadvantages of the related art.

An object of the present disclosure is to provide a method of transmitting broadcast signal relevant to an emergency alert, method of processing broadcast signal and a broadcast receiver for the same, by which information on a channel for carrying an emergency alert broadcast can be prevented from being overlapped with information on other general channels.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of transmitting a digital broadcast signal according to the present disclosure comprises the steps of generating an emergency alert table including frequency information of an emergency alert channel, and transmitting a digital broadcasting signal including the emergency alert table, wherein the frequency information of the emergency alert channel is inserted in a descriptor that provides an additional pointer to the emergency alert channel, wherein the descriptor references the emergency alert channel by means of the frequency information.

In another aspect of the present disclosure, a method of transmitting a digital broadcast signal according to the present disclosure comprises the steps of generating an emergency alert table including program number information of an emergency alert channel, and transmitting a digital broadcasting signal including the emergency alert table, wherein the program number information of the emergency alert channel is inserted in a descriptor that provides an additional pointer to the emergency alert channel, wherein the descriptor references the emergency alert channel by means of the program number information.

In another aspect of the present disclosure, a method of processing emergency alert information in a receiver comprises the steps of receiving a digital broadcasting signal including frequency information of an emergency alert channel in emergency alert table, parsing the emergency alert table and extracting the frequency information and channel number information of the emergency alert channel from the emergency alert table, and tuning to the emergency alert channel when a state of emergency channel tuning to the emergency alert channel occurs, wherein the emergency alert channel is acquired from the channel number information and additionally referenced by the frequency information.

In another aspect of the present disclosure, a method of processing emergency alert information in a receiver comprises the steps of receiving a digital broadcasting signal including program number information of an emergency alert channel in the emergency alert table, parsing the emergency alert table and extracting the program number information and channel number information of the emergency alert channel from the emergency alert table, and tuning to the emergency alert channel if a state of emergency channel tuning to the emergency alert channel occurs, wherein the emergency alert channel is acquired from the channel number and additionally referenced by the program number information.

In another aspect of the present disclosure, a digital television receiver comprises a tuner for receiving a digital broadcasting signal including frequency information of an emergency alert channel in the emergency alert table, a parser for parsing the emergency alert table and extracting the frequency information and channel number information of the emergency alert channel from the emergency alert table, and a controller for controlling the tuner to tune to the emergency alert channel when a state of emergency channel tuning to the emergency alert channel occurs, wherein the emergency alert channel is acquired from the channel number information and additionally referenced by the frequency information.

In another aspect of the present disclosure, a digital television receiver comprises a tuner for receiving a digital broadcasting signal including program number information of an emergency alert channel in the emergency alert table, a parser for parsing the emergency alert table and extracting the program number information and channel number information of the emergency alert channel from the emergency alert table, and a controller for controlling the tuner to tune to the emergency alert channel when a state of emergency channel tuning to the emergency alert channel occurs, wherein the emergency alert channel is acquired from the channel number information and additionally referenced by the program number information.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 is a diagram of a bit stream syntax of an emergency alert table (EAT) defined by terrestrial broadcasting according to a first embodiment of the present disclosure;

FIG. 4 is a diagram of a bit stream syntax of an emergency alert table (EAT) defined by terrestrial broadcasting according to a second embodiment of the present disclosure;

FIG. 5 is a diagram of an EAT channel descriptor (EAT_channel_descriptor) defined by terrestrial broadcasting according to a second embodiment of the present disclosure;

DETAILED DESCRIPTION OF THE INVENTION

Figures 2, 3:
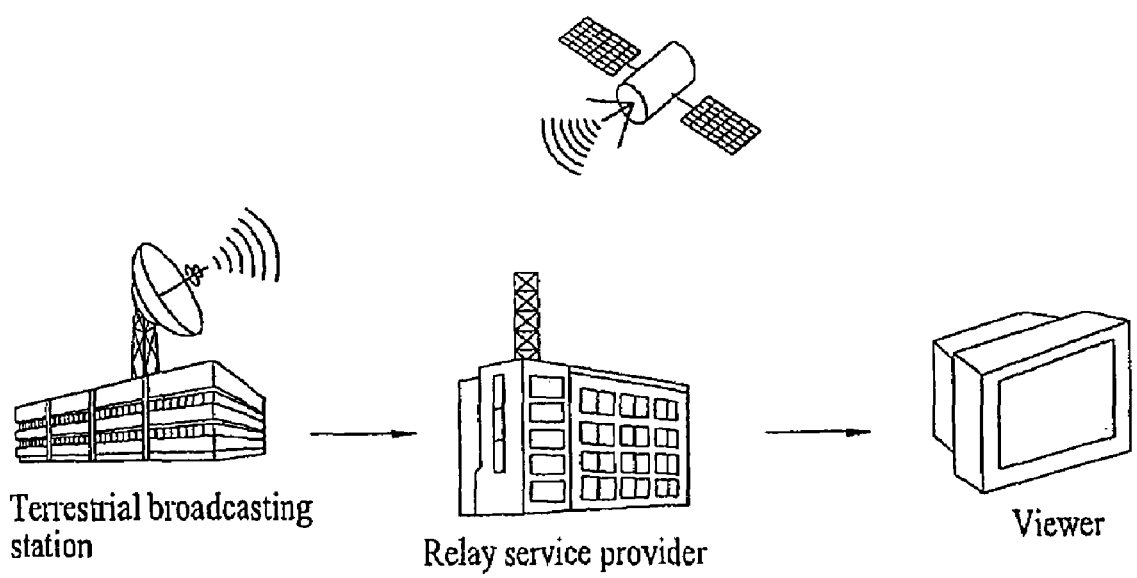
FIG. 2 is a diagram of an EAT channel descriptor (EAT_channel_descriptor) defined by terrestrial broadcasting according to a first embodiment of the present disclosure.
FIG. 3 is a diagram of a system, in which a relay service provider transmits EAT using a predetermined protocol, according to one embodiment of the present disclosure.

Reference will now be made in detail to the embodiments of the present disclosure, examples of which are illustrated in the accompanying drawings. Wherever possible, the same reference numbers will be used throughout the drawings to refer to the same or like parts.

An emergency alert system message can be received via OOB (out of band) by inserting a cable card (CableCARD) in a cable digital TV of North America. If the cable card is not inserted, the emergency alert system message can be received via in-band. It is checked whether the received emergency alert system (EAS) message is received via a band different from that for a previously received emergency alert system message. If the received emergency alert system message is received via the band different from that of the previously received emergency alert system message, it is able to omit a redundancy check of the emergency alert system message by clearing a sequence number. On the other hand, if the received emergency alert system message is received via the same band of the previously received emergency alert system message, the redundancy check of the emergency alert system message is carried out. If it is a redundant message, the processing of the emergency alert system message is stopped.

After completion of the basic check, a channel should be switched to an emergency alert system channel, on which emergency alert system contents are being broadcasted, according to a priority of the corresponding emergency alert system message. A number of the channel can be discriminated into an in-band EAS or an OOB EAS according to a reception band of the emergency alert system message.

The emergency alert system message received via in-band can be transmitted by including an emergency alert system broadcast with a pair of a major channel number and a minor channel number. This scheme is possible because there is a cable broadcasting station as a subject that manages all broadcast channel numbers under North America Cable Broadcasting System. Yet, in case that the above-explained specification of cable digital broadcasting are applied to a terrestrial broadcasting system as they are, the following problem may rise.

First of all, terrestrial broadcasts received by a terrestrial-receivable digital TV include signals transmitted by different terrestrial broadcasting stations, respectively. A channel number of a channel transmitted by each of the different terrestrial broadcasting stations can be randomly set up according to PSIP (program and system information protocol) standards. Assuming that different broadcasting stations simultaneously use a channel number of a channel on which an emergency alert situation is being broadcasted, a digital TV having received an emergency alert system message (e.g., EAT) has a problem in deciding a channel to switch. Due to such a problem, it is unable to apply syntax of an emergency alert system message employed by North American cable digital TV to a terrestrial broadcasting system as it is.

Hence, the present disclosure intends to modify and expand a syntax of EAT to apply specifications of an emergency alert system message used by a cable digital broadcasting system to a terrestrial broadcasting system. Meanwhile, in order to apply emergency alert broadcast statement identically by considering a broadcasting environment when a terrestrial broadcast is retransmitted via a relay service provider, the present disclosure is also characterized in designing EAT the relay service provider need not amend.

As mentioned in the foregoing description, since all broadcasts in the North American Cable Broadcasting System are managed by cable broadcasting stations, it is able to set broadcast titles or channel numbers arbitrarily. In normal cases, the broadcast titles or channel numbers can be set different from each other. When a cable broadcasting station transmits an emergency alert system message via in-band, if a priority of the emergency alert system message is high enough to switch to a channel on which an emergency alert situation is being broadcasted, it facilitated to switch to an emergency alert system broadcast channel by performing channel tuning to a channel corresponding to a channel number received by being included in the message according to SCTE (society of cable television engineers) 18, and more particularly, to emergency alert message for cable.

The above-described emergency alert broadcast channel processing method in the conventional North American cable broadcasting system can be processed without special problems since there exits the assumption of protocol indicating that all channel numbers of the receive cable are not overlapped with each other. Yet, if the emergency alert message syntax of the able broadcasting, which is defined by SCTE 18, is applied to a terrestrial broadcasting system as it is, a problem may be caused by the problem of channel overlapping possibility. Hence, the present disclosure intends to solve the problem of the overlapped channel occurrence, the problem that the relay service provider should amend EAT, and the like in a manner of compensating/expanding syntax of an emergency alert broadcast message used for a cable broadcasting system.

FIG. 1 is a diagram of a bit stream syntax of an emergency alert table (EAT) defined by terrestrial broadcasting according to a first embodiment of the present disclosure, and FIG. 2 is a diagram of an EAT channel descriptor (EAT_channel_descriptor) defined by terrestrial broadcasting according to a first embodiment of the present disclosure.

EAT (emergency alert table) and EAT channel descriptor (EAT_channel_descriptor), which are defined by the present disclosure, are explained with reference to FIG. 1 and FIG. 2 as follows.

First of all, an emergency alert broadcast message specification of cable broadcasting is defined to enable both of an emergency alert message received via in-band and an emergency alert message received via OOB (out off band) to be processed. Yet, in terrestrial broadcasting, it is unable to receive an emergency alert message via OOB. Hence, the present disclosure is characterized in defining EAT of a terrestrial broadcasting system, a shown in FIG. 1, in a manner of removing all fields associated with OOB from EAT of a cable broadcasting system. If so, a processing speed for EAT of a terrestrial broadcast can be improved by deleting the unnecessary fields.

Fields shown in FIG. 1 are described in brief as follows. Of course, they can be understood more easily with reference to EAT of cable broadcasting in some cases.

Referring to FIG. 1, a 'table_ID' field is a syntax for indicating an emergency alert message of a terrestrial broadcast. For instance, the 'table_ID' field can be set to 0xD8. "section_syntax_indicator" field can be set to 1. This 1-bit field shall be set to '1'. It denotes that the table section follows the generic MPEG-2 section syntax beyond the section_length field. The 'section_length' field defines the number of remaining bytes and shall be set to a value smaller than 4,093. This 12-bit field specifying the number of remaining bytes in this section immediately follows the section_length field up to the end of the section. The value of the section_length shall be no larger than 4093.

And, 'sequence_number' field can indicate a sequence of emergency alert message. If a semantic of the message is changed, this field can be incremented by a value 0 to 31. (This 5-bit field is the sequence number of this emergency alert message. The sequence_number shall be incremented by 1 (modulo 32), when any change occurs in the information carried in the emergency alert message). And, this field can indicate a version of the emergency alert message. "current_next_indicator" field, which is 1-bit indicator, shall always be set to '1' to indicate that the table sent is always currently applicable.

"section number" field indicates that a table sent shall occupy a length of at least one section and can be set to 0x00 (this table shall be at most one section long). "protocol_version" field indicates a version value of PSIP (Program and System Information Protocol). This 8-bit unsigned integer field whose function is to allow, in the future, this table type to carry parameters that may be structured differently than those defined in the current protocol. "EAS_originator_code" field can indicate the entity that originally initiated the activation of the EAS. "EAS_event_code_length" field can indicate the length in bytes of the EAS_event_code field to follow. "EAS_event_code" field can indicate the nature of the EAS activation. For instance, this field can indicate such a type of emergency as flood, earthquake, terror, etc. together with emergency information such as large-scale earthquake, medium-scale earthquake, small-scale earthquake, etc.

"nature_of_activation_text_length" field can indicate the total length in bytes of the nature_of_activation_text( ) field to follow. For instance, if a value of "nature_of_activation_text_length" field is '0', "nature_of_activation_text" can indicate that the nature_of_activation_text( ) field is not included in this alert message. "nature_of_activation_text" field may contain a syntax which represents a short textual representation of the event code for on-screen display.

"alert_message_time_remaining" field, which is an 8-bit unsigned integer field, in the range 0 to 120, shall indicate the time remaining in the alert message, in seconds. A value of zero shall indicate an alert message period of indefinite duration. And, the "alert_message_time_remaining" field can indicate a duration time, which should be sustained until an emergency alert message turn into an interrupt message returns, by a second unit. "event_start_time" field, which is a 32-bit unsigned integer quantity, represents the start time of this alert event as the number of seconds since 00 hours UTC3, Jan. 6, 1980. Meanwhile, according to a time comparison to an STT time of a corresponding channel with reference to GPS time, in case of a past time, a terrestrial broadcast receiver ignores the EAT. In case of a future time, it can decided whether to load the EAT in a memory of the terrestrial broadcast receiver by comparison to a value of "event_duration". And, the "event_duration" field can be set to a 16-bit unsigned integer that, when nonzero, represents the number of minutes the alert is expected to last. A value of zero indicates that the event duration is unknown (indefinite). And, the terrestrial broadcast receiver can delete the no-longer useful previous emergency alert event stored in the memory of the terrestrial broadcast receiver using "event_start_time" and "event_duration" fields.

"alert_priority" field can mean a syntax indicating a priority or significance of an emergency. "alert_text_length" field indicates the number of total bytes of "alert_text( )" field and, for instance, can beset to a 16-bit unsigned integer number that shall define the total length in bytes of the alert_text( ) field to follow. A value of zero indicates the alert_text( ) field is not included in this alert message. And, the "alert_text( )" field may have a data structure containing a multiple_string_structure( ) which shall represent a textual description of the emergency alert for on-screen display. And, the emergency alert text can be set to be slowly scrolled bottom to top or right to left on a screen of the terrestrial broadcast receiver.

"location_code_count" field can be set to an 8-bit unsigned integer number in the range 1 to 31 that shall represent the number of region definitions to follow in the "for" loop. Yet, in the region definitions, the regional names according to administrative district discrimination in U.S.A. are exemplarily used, which does not restrict the scope of the appended claims and heir equivalents of the present disclosure. "state_code" field can be set to an 8-bit unsigned number in the range 0 to 99 that represents the State, Territory or Offshore (Marine Area) affected by the emergency alert. The "state_code" field shall be coded according to State and Territory FIPS number codes. The value of 0 shall indicate all states, or a national level alert. "state_subdivision_code" field can be set to an 8-bit numbering the range 0 to 99. And, "county_code" field represents a specific county of the state relevant to an emergency and can be set to a number in the range 0 to 99. The "county_code" field can be coded according to FIPS number codes of a state and area. If the field is set to 0, it can indicate that all counties are in emergency.

"exception_major_channel_number" field is able to represent a major channel number of an exception service in association with in-band SI. And, "exception_minor_channel_number" field can represent a minor channel number of an exception service in association with in-band SI if it is not set to 0.

In the present disclosure, new fields required for channel tuning are defined in the descriptor part shown in FIG. 1 to solve the overlapping problem of channel number. An EAT channel descriptor (EAT_channel_descriptor) proposed by the present disclosure is shown in FIG. 2. The name of the EAT channel descriptor is just exemplary. The EAT channel descriptor is explained in detail as follows.

"descriptor_tag" field is an field that identifies whether a corresponding descriptor is an EAT channel descriptor and can be set to '0xEA' for example. "descriptor_length" field can be used to represent a length or size of a corresponding descriptor. "details_major_channel_number" field represents a major channel number for broadcasting an emergency alert broadcast. And, "details_minor_channel_number" field represents a minor channel number for broadcasting an emergency alert broadcast.

"carrier_frequency" field identifies a frequency for transmitting an emergency alert broadcast and "details_channel_programNumber" field identifies a program number within the frequency for transmitting the emergency alert broadcast. And, "details_channel_tsID" field can be used as a field that identifies a transport stream ID for transmitting broadcast contents.

The present disclosure defines the channel number information of terrestrial broadcasting for transmitting an emergency alert broadcast in an EAT channel descriptor (EAT_channel_descriptor) to enable each terrestrial broadcasting station to be discriminated in accordance with a preset reference. The channel number information may be defined in a body part of the EAT table. The channel number information can be determined via the "details_major_channel_number" and "details_minor_channel_number" fields.

Meanwhile, the present disclosure defines frequency information of terrestrial broadcasting for transmitting an emergency alert broadcast in an EAT channel descriptor to enable each terrestrial broadcasting station to be discriminated in accordance with a preset reference. The channel number information can be referenced by the "carrier_frequency" field. Thus, in case that the EAT channel descriptor (EAT_channel_descriptor) shown in FIG. 2 is added to an EAT of a terrestrial broadcast signal, it is able to remove the program number overlapping within a frequency. Hence, it is able to define a channel, which carries an emergency alert broadcast without the channel overlapping occurrence, in EAT.

FIG. 3 is a diagram of a system, in which a relay service provider transmits EAT using a predetermined protocol, according to one embodiment of the present disclosure. A method of transmitting an EAT, if a relay service provider retransmits a terrestrial broadcast, is explained with reference to FIG. 3 as follows.

First of all, in case that a terrestrial broadcast is retransmitted via a relay service provider, a frequency of a corresponding terrestrial channel can be changed. So, it is highly probable that the emergency alert message format (e.g., EAT channel descriptor EAT_channel_descriptor) of the terrestrial broadcasting system defined in FIG. 1 and FIG. 2 may not perform channel switching to a correct channel. This is because the terrestrial relay service provider, as shown in FIG. 3, may perform retransmission by mixing cable channel, satellite channel, terrestrial channel and the like together without using a terrestrial frequency transmitted by a terrestrial broadcasting station. In this case, it is highly probable that the frequency transmitted by the terrestrial broadcasting station may not be used due to the problem of the overlapping with another channel.

FIG. 4 is a diagram of a bit stream syntax of an emergency alert table (EAT) defined by terrestrial broadcasting according to a second embodiment of the present disclosure, and FIG. 5 is a diagram of an EAT channel descriptor (EAT_channel_descriptor) defined by terrestrial broadcasting according to a second embodiment of the present disclosure. Newly defined EAT (emergency alert table) and EAT channel descriptor (EAT_channel_descriptor) of terrestrial broadcasting according to the present disclosure are explained as follows.

Compared to the first embodiment of the present disclosure shown in FIG. 1 and FIG. 2, the second embodiment of the present disclosure is characterized in adding a channel index field (channel_index). A channel index field shown in FIG. 4 or FIG. 5 is usable in representing information that identifies a relay service provider who manages at least one location. The channel index field is designed in a manner of being defined below a location code count field (location_code_count) in an EAT channel descriptor (EAT_channel_descriptor) to be mapped to each other. In particular, to prepare for a case that a terrestrial channel is retransmitted via a relay service provider, the present disclosure defines an index (channel_index) of a transmission location using a location code (location_code_count) in a format (EAT) of an emergency alert message.

Since a corresponding frequency and a channel index of an emergency alert broadcast of a corresponding location are defined in the EAT channel descriptor (EAT_channel_descriptor), although the relay service provider does not attempt to change the EAT or read the descriptor, a receiver can be normally tuned to an emergency alert broadcast channel in case of an emergency occurrence. Yet, it is mandatory for the present disclosure to amend the 'location_code_count' field by considering a terrestrial retransmission procedure, whereas 'location_code_count' field is optional in EAT used for an emergency alert broadcast of North American Cable Broadcasting.

Details are explained in the following description for example. First of all, it is assumed that a terrestrial broadcasting station 'MBC' transmits broadcast signals including EAT and the like to a broadcast relay service provider 'Taejeon', a broadcast relay service provider 'Chungju', a broadcast relay service provider 'Yeouido', and the like. In this case, a channel index of the broadcast relay service provider 'Taejeon' is set to 0, a channel index of the broadcast relay service provider 'Chungju' is set to 1, and a channel index of the broadcast relay service provider 'Yeouido' is set to 2. If the channel index is 0, a physical channel number of the MBC broadcasting is mapped to '60'. If the channel index is 1, a physical channel number of the MBC broadcasting is mapped to '70'. If the channel index is 2, a physical channel number of the MBC broadcasting is mapped to '80'.

Hence, even if a relay service provider having received the EAT and the like transmits the received EAT to a broadcast receiver intactly without amending a physical channel number, a frequency and the like separately or without changing an EAT channel descriptor and the like, the broadcast receiver can be tuned to an initially scheduled emergency alert broadcast channel without error.

Figure 6:
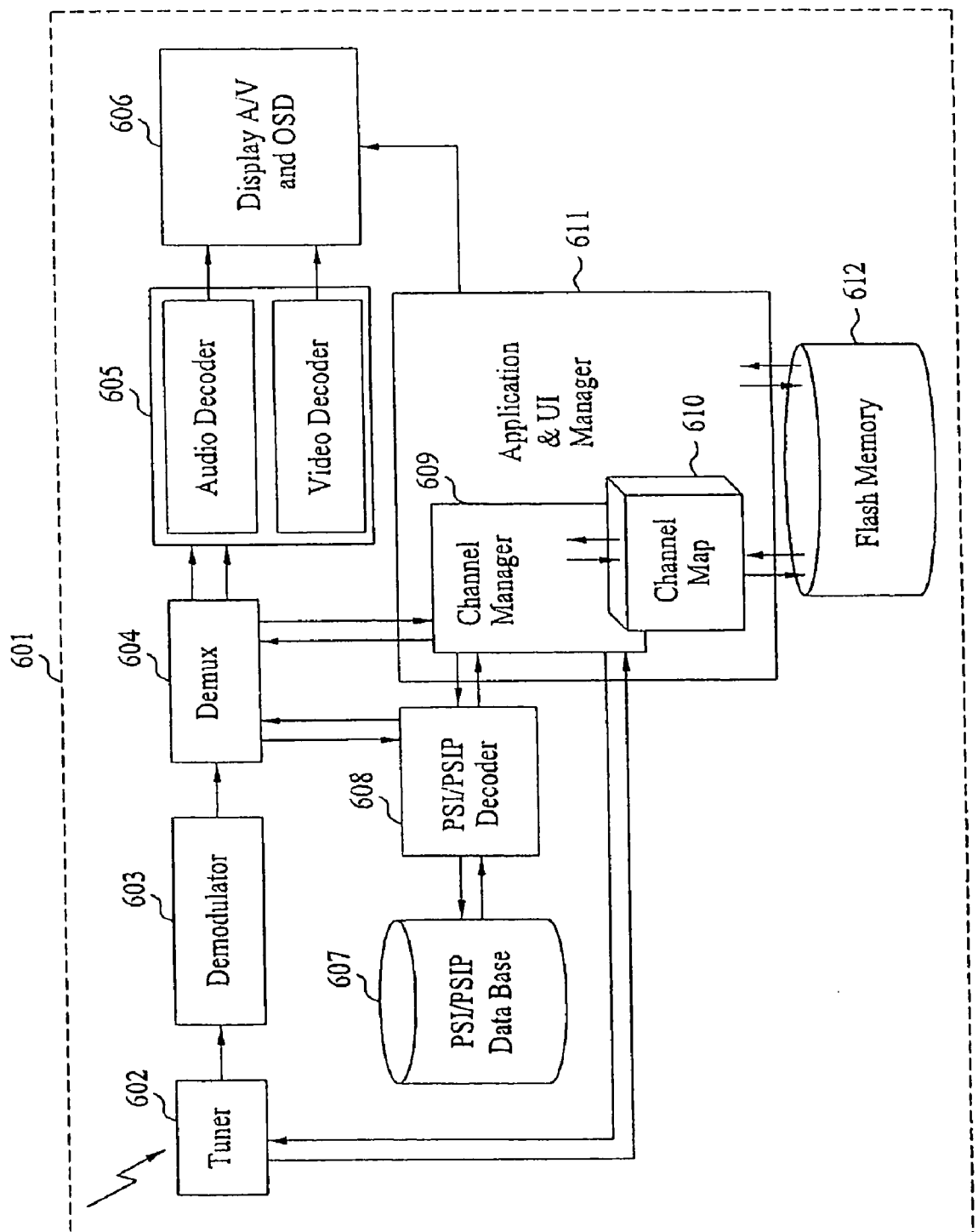
FIG. 6 is a block diagram of a broadcast receiver for receiving and processing EAT according to one embodiment of the present disclosure.

FIG. 6 is a block diagram of a broadcast receiver for receiving and processing EAT according to one embodiment of the present disclosure. An operation of a broadcast receiver, which receives and processes an EAT channel descriptor, according to the present disclosure is explained with reference to FIG. 6 as follows. Referring to FIG. 6, a broadcast receiver 601 according to the present disclosure includes a tuner 602, a demodulator 603, a demultiplexer 604, an A/V decoder 605, a display unit 606, a PSI/PSIP database 607, a PSI/PSIP decoder 608, a channel manager 609, a channel map 610, an application and UI manager 611, a flash memory 601, and the like. In this case, the broadcast receiver 601 means a digital television (DTV) capable of terrestrial broadcast reception or the like for example.

The tuner 602 is able to receive a terrestrial broadcast signal containing a PSI/PSIP (program and system information/program and system information protocol) table. For instance, the PSIP table can include an emergency alert table (EAT) and the like. And, operations of the tuner 602 can be controlled by the channel manager 609. Moreover, the tuner 602 enables a result from receiving the terrestrial broadcast signal to be recorded back in the channel manager 609. The demodulator 603 demodulates a signal tuned by the tuner 602 by VSB/EVSB (vestigial sideband/enhanced vestigial sideband) demodulation.

The demultiplexer 604 plays a role in demultiplexing audio data, video data, and PSI/PSIP table data from the signal demodulated by the demodulator 603. In this case, the audio/video data demultiplexing can be controlled by the channel manager 609, whereas the PSI/PSIP table data demultiplexing can be controlled by the PSI/PSIP decoder 608. The demultiplexed PSI/PSIP table is transferred to the PSI/PSIP decoder 608, while the demultiplexed audio/video data are transferred to the A/V decoder 605. The A/V decoder 605 then decodes the transferred data.

The PSI/PSIP decoder 608 parses a PSI/PSIP section, reads the entire rest of actual section data failing to be section-filtered by the demultiplexer 604, and then records the data in the PSI/PSIP database 607. And, the PSI/PSIP decoder 608 is capable of parsing EAT information contained in the PSI/PSIP. Using channel information and the like contained in the parsed EAT information, the channel manager 609 controls the tuner 602 to be tuned to a channel of a terrestrial broadcast that carries an emergency alert broadcast.

Meanwhile, the EAT can include the EAT channel descriptor (EAT_channel_descriptor) shown in FIG. 4 or FIG. 5, which has been sufficiently explained in the descriptions of FIG. 4 and FIG. 5. And, it is apparent to those skilled in the art that a DTV for processing the EAT can be designed through FIG. 4 and FIG. 5.

Figure 7:
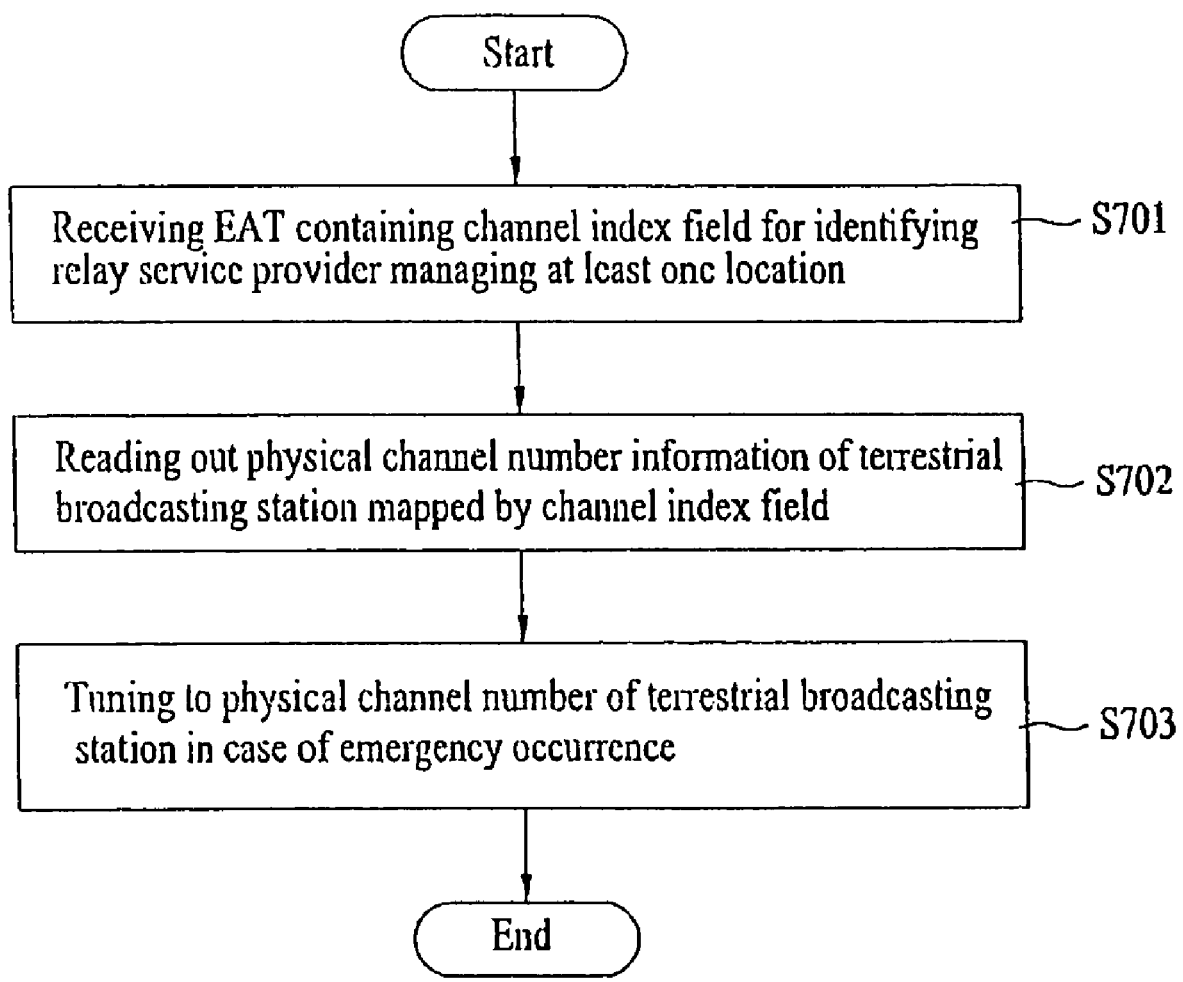
FIG. 7 is a flowchart of a process for receiving and processing EAT according to one embodiment of the present disclosure.

FIG. 7 is a flowchart of a process for receiving and processing EAT according to one embodiment of the present disclosure. An EAT processing method according to the present disclosure is explained with reference to FIG. 7 as follows. In particular, FIG. 7 schematically depicts the descriptions for FIGS. 1 to 6 in accordance with a time flow.

Referring to FIG. 7, a broadcast receiver receives an emergency alert table (EAT) containing a channel index field (channel_index) that identifies a relay service provider managing at least one location (S701). The broadcast receiver may be a DTV or the like for example. The above-explained channel index can be added below a location code count field (location_code_count) in an EAT channel descriptor of the EAT. The receiver reads out physical channel number information of a terrestrial broadcasting station mapped by the channel index field (S702). In this case, the physical channel number information can be defined in 'details_major_channel_number' and 'details_minor_channel_number' fields and the like below the EAT channel descriptor. And the physical channel number information can be additionally referenced by the frequency information and/or the program number information.

In case that an emergency takes place, the receiver is tuned to a physical channel number of the terrestrial broadcasting station (S703). Accordingly, since a channel number of a specific terrestrial broadcasting station per location is determined in accordance with a channel index, despite that a relay service provider transmits a received EAT intact to a broadcast receiver, the broadcast receiver has no problem in being tuned to an emergency alert channel.

It will be apparent to those skilled in the art that various modifications and variations can be made in the present disclosure without departing from the spirit or scope of the inventions. Thus, it is intended that the present disclosure covers the modifications and variations of this disclosure provided they come within the scope of the appended claims and their equivalents.

What is claimed is:

1. A method of transmitting a digital broadcasting signal, comprising:

generating an emergency alert table including a plurality of data fields, wherein one of the data fields includes information that includes an emergency alert table descriptor, wherein the emergency alert table descriptor contains additional data fields, wherein the additional data fields indicate frequency information, program number information of an emergency alert channel and identification information of a service provider managing at least one area; and transmitting, at a digital television broadcast transmitter, a digital broadcasting signal including the emergency alert table;

wherein the frequency information and the program number information of the emergency alert channel are inserted in the additional data fields that provide additional pointers to the emergency alert channel, wherein the emergency alert table descriptor references the emergency alert channel by means of the frequency information, the program number information, and the identification information of the service provider managing at least one area.

2. The method of claim 1, wherein the channel number information includes an in-band major channel number and an in-band minor channel number of the emergency alert channel.

3. The method of claim 1, wherein the emergency alert table further includes alert priority information indicating a priority of alert.

4. The method of claim 1, wherein the service provider is a cable broadcast station.

5. A method of processing emergency alert information in a receiver, comprising:

receiving, at a digital broadcast receiver, a digital broadcasting signal including an emergency alert table containing a plurality of data fields, wherein one of the data fields includes information that includes an emergency alert table descriptor, wherein the emergency alert table descriptor contains additional data fields, wherein the additional data fields indicate frequency information, program number information of an emergency alert channel and identification information of a service provider managing at least one area;

parsing the emergency alert table and extracting the frequency information, the program number information and the identification information of the service provider managing at least one area from the emergency alert table descriptor included in the emergency alert table and extracting channel number information of the emergency alert channel from the emergency alert table; and tuning to the emergency alert channel when a state of emergency channel tuning to the emergency alert channel occurs;

wherein the emergency alert channel is acquired from the channel number information.

6. The method of claim 5, wherein the channel number information includes an in-band major channel number and an in-band minor channel number of the emergency alert channel.

7. The method of claim 5, wherein the emergency alert table further includes alert priority information indicating a priority of alert.

8. The method of claim 5, wherein the service provider is a cable broadcast station.

9. A digital television receiver, comprising:

a tuner for receiving a digital broadcasting signal including an emergency alert table containing a plurality of data fields, wherein one of the data fields includes information that includes an emergency alert table descriptor, wherein the emergency alert table descriptor contains additional data fields, wherein the additional data fields indicate frequency information, program number information of an emergency alert channel, and identification information of a service provider managing at least one area;

a parser for parsing the emergency alert table and extracting the frequency information, the program number information and the identification information of the service provider managing at least one area from the emergency alert table descriptor included in the emergency alert table and channel number information of the emergency alert channel from the emergency alert table; and a controller for controlling the tuner to tune to the emergency alert channel when a state of emergency channel tuning to the emergency alert channel occurs, wherein the emergency alert channel is acquired from the channel number information.

10. The digital television receiver of claim 9, wherein the channel number information includes an in-band major channel number and an in-band minor channel number of the emergency alert channel.

11. The digital television receiver of claim 9, wherein the emergency alert table further includes alert priority information indicating a priority of alert.

12. The method of claim 9, wherein the service provider is a cable broadcast station.

* * * * *